United States Patent [19]
Arora et al.

[11] Patent Number: 4,912,154
[45] Date of Patent: Mar. 27, 1990

[54] WATER-DISPERSIBLE AIR-DRYING COATINGS CONTAINING 2-OXAZOLINE GROUPS

[75] Inventors: Kartar S. Arora, Darien; Jose J. Chettiath, Homewood, both of Ill.

[73] Assignee: The Sherwin-Williams Company, Cleveland, Ohio

[21] Appl. No.: 292,596

[22] Filed: Dec. 30, 1983

[51] Int. Cl.⁴ .............................................. C08G 18/30
[52] U.S. Cl. ..................................... 524/840; 528/73; 428/423.1
[58] Field of Search ........................... 524/840; 528/73; 428/423.1

[56] References Cited

U.S. PATENT DOCUMENTS

| | | | |
|---|---|---|---|
| 3,248,397 | 4/1966 | Purcell | 260/307 |
| 3,412,054 | 11/1968 | Milligan et al. | 260/18 |
| 3,479,310 | 11/1969 | Dieterich et al. | 260/29.2 |
| 3,870,684 | 3/1975 | Witt et al. | 260/75 |
| 3,922,253 | 11/1975 | Jerabek et al. | 260/77.5 |
| 4,066,591 | 1/1978 | Scriven et al. | 260/29.2 |
| 4,092,286 | 5/1978 | Noll et al. | 260/29.2 |
| 4,116,902 | 9/1978 | Harris et al. | 260/22 |
| 4,132,686 | 1/1979 | Toyoshima et al. | 260/21 |
| 4,147,674 | 4/1979 | Vasta | 260/17 |
| 4,147,679 | 4/1979 | Scriven et al. | 260/29.2 |
| 4,254,168 | 3/1981 | Monson | 427/409 |
| 4,268,426 | 5/1981 | Williams et al. | 260/22 |
| 4,277,380 | 7/1981 | Williams et al. | 260/18 |
| 4,375,498 | 3/1983 | Le Minez et al. | 428/416 |
| 4,382,114 | 5/1983 | Hohlein et al. | 428/423.1 |
| 4,489,135 | 12/1984 | Drexler et al. | 428/423.1 |
| 4,719,132 | 1/1988 | Porter, Jr. | 427/409 |

FOREIGN PATENT DOCUMENTS 0220000  4/1987  European Pat. Off. .

OTHER PUBLICATIONS

Wilma J. Schneider and Lyle E. Gast, *Water-Dispersible Urethane Polyesteramide Coatings From Linseed Oil*, (Journal of Coatings Technology, vol. 50, No. 646, Nov. 1978), pp. 76-81.
Angus Chemical Company Technical Data Sheet, TDS 10, *Aminohydroxy Compounds*, pp. 1-8.
Copyright 1986, International Minerals & Chemical Corporation, *A Complete Guide to DMPA$^R$ Brand of Dimethylolpropionic Acid*, pp. 1-54.
International Minerals & Chemical Corporation, ICD Product Guides, IC Series, TDS No. 34, *DMPA$^R$ Dimethylolpropionic Acid*.

Primary Examiner—Maurice J. Welsh
Attorney, Agent, or Firm—Robert E. McDonald; Steven W. Tan

[57] ABSTRACT

Air-drying, water-reducible, acid-functional polyurethanes are obtained by reacting:
(i) a 2-oxazoline containing adduct having the structure:

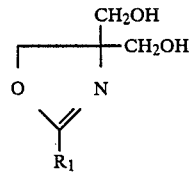

wherein $R_1$ is the aliphatic fatty acid residue from a fatty acid $R_1COOH$; and
(ii) a diisocyanate; and
(iii) an acid-functional compound which also has two active hydrogen groups, other than acid groups, which are reactive with the diisocyanate.

37 Claims, No Drawings

WATER-DISPERSIBLE AIR-DRYING COATINGS CONTAINING 2-OXAZOLINE GROUPS

BACKGROUND OF THE INVENTION

1. Field of the Invention

This invention relates to air-drying polyurethane polymers obtained from drying oil or semi-drying oil fatty acid based adducts having 2-oxazoline groups. The polymers are acid-functional and are especially useful as water-dispersable air-drying coatings.

2. Description of the Prior Art

Water-reducible polymers containing unsaturated fatty acids as binders for air-drying coatings are known in the prior art. Alkyd resins prepared by the reaction of unsaturated fatty acids and polyols are one example of polymers containing unsaturated fatty acids which are widely used as binders in surface coatings because of their good application and performance characteristics. Alkyd resins are, however, known to suffer from certain disadvantages when used in water-reducible coatings. In particular, the ester groups in the alkyd resins can be hydrolyzed or transesterified esterification can lead to polymer chain degradation, and can also result in the cleavage of the unsaturated fatty acid groups. The unsaturated fatty acid groups act as the crosslinking sites in the polymer and are responsible for the development of coating properties, such as chemical resistance, flexibility, hardness and durability. Therefore, the performance properties of coatings obtained from water-reducible alkyds can deteriorate on storage of the aqueous dispersions of these resins.

Polyurethanes as a class of binders for surface coatings are known to have good chemical resistance, adhesion and durability. The properties are due, at least in part, to the stability of the urethane groups in a variety of environments. Thus, water-reducible unsaturated fatty acid substituted polyurethanes have been utilized as film-forming polymers in order to minimize some of the disadvantages of water-reducible alkyds.

U.S. Pat. No. 3,412,054, issued Nov. 19, 1968 to Milligan and Hoy, discloses water-reducible polyurethanes for use in surface coatings. The unsaturated fatty acids substituted polyurethanes disclosed are obtained by reactions of unsaturated fatty acid ester polyols or unsaturated fatty acids and diisocyanates. Air-drying water-reducible polyurethane modified alkyds are disclosed in U.S. Pat. No. 4,116,902 issued Sept. 26, 1978 to Harris and Pollack. The unsaturated fatty acids described in that patent are part of an alkyd chain which is further reacted with diisocyanates. U.S. Pat. No. 4,147,679, issued Apr. 3, 1979, to Shriven and Chan, also discloses water-reducible urethane coating compositions containing unsaturated fatty acids. Unsaturated fatty acid substituted polyester-polyols are used in the preparation of these polyurethane coatings materials. Water-reducible unsaturated fatty acids substituted polyurethanes are also disclosed in U.S. Pat. Nos. 4,268,426 and 4,277,380, issued May 19, 1981 and July 7, 1981, respectively to Williams and Rogemoser. The unsaturated fatty acids are incorporated in these polyurethanes by the use of the ester-polyols, in particular, unsaturated fatty acid esters of pentaerythritol.

Schneider and Gast (Journal of Coating Technology, 1978, 50 (646), 76) have reported the preparation of water-dispersable polyurethanes from adducts of linseed oil and N,N-diethanolamide. However, the reaction of linseed oil and N,N-diethanolamide gave mixtures of monoglyceride and amide of linseed fatty acids.

The reaction of tris(hydroxymethyl)aminomethane and fatty acids are disclosed by Purcell in U.S. Pat. No. 3,248,397 (issued Apr. 26, 1966). However, the invention disclosed by Purcell teaches the preparation of fatty acid substituted vinyl oxazolines by reaction of more than three moles of fatty acids per mole of tris(hydroxymethyl)aminomethane and further reaction of the product with formaldehyde. The preparation of copolymers of this vinyl oxazoline by free radical polymerization is also disclosed by Purcell. Use of fatty acid substituted vinyl oxazoline to produce water-reducible acrylic copolymers for air-drying coatings is disclosed in U.S. Pat. No. 4,147,674 (issued to Vasta on Apr. 3, 1979). In both patents, fatty acid substituted vinyl oxazoline is incorporated in the copolymer by radical initiated chain-growth polymerization reactions.

Although the polyurethane materials of the prior art provide some improvement in hydrolytic stability over the fatty acid alkyds, the poor hydrolytic stability of alkyds due to cleavage of fatty acid moieties has not been completely overcome.

This invention involves the discovery that water-reducible unsaturated fatty acid substituted polyurethanes can be prepared by the reactions of
(i) a 2-oxazoline containing adduct having two hydroxyl groups,
(ii) diisocyanates, and
(iii) acid-functional compounds which also contain two active hydrogen groups, other than acid groups, which are reactive with the diisocyanate.

The 2-oxazoline compounds obtained by the reaction of essentially equimolar amounts of tris(hydroxymethyl)aminomethane and fatty acids or fatty acid derivatives to produce the fatty acid amide followed by cyclization to obtain the 2-oxazoline product. Since the unsaturated fatty acid moieties of the present invention are attached to the polymer backbone via the oxazoline groups, these water-reducible polyurethanes display improved hydrolytic stability when compared to the water-reducible polyurethanes and water-reducible alkyds of the prior art. Aqueous solutions of polyurethanes prepared according to this invention have shown excellent stability after storage at 120° F. for four weeks or more.

SUMMARY OF THE INVENTION

This invention involves acid-functional air-drying polyurethane polymers. These polymers can be neutralized with a base to provide water-reducible compositions which exhibit excellent hydrolytic stability. The air-drying polyurethanes of this invention comprise the reaction product obtained by reacting:
(i) a 2-oxazoline containing adduct having the structure:

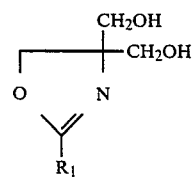

wherein $R_1$ is the aliphatic fatty acid residue from a fatty acid $R_1COOH$; and
(ii) a diisocyanate; and (iii) an acid-functional compound which also has two active hydrogen groups, other than acid groups, which are reactive with the diisocyanate.

Optionally, additional materials such as chain extenders and/or small amounts of polyfunctional (i.e., more than 2 active hydrogen or isocyanate containing groups per molecule) materials can also be included in the reaction mixture along with the 2-oxazoline fatty acid adduct, the diisocyanate and the acid-functional compound to produce the reaction product. The reaction product, even if it incorporates the optional chain extenders and/or polyfunctional materials, will be ungelled. By "ungelled" is meant that the reaction product has a fluid nature and can be dissolved in a suitable solvent. Once the reaction product is allowed to cure, e.g. by air oxidation or optional crosslinking, the molecular weight of the reaction product would increase to an extent at which it is no longer fluid and cannot be redissolved in any suitable solvent.

The air-drying polyurethane preferably is prepared to provide an acid value of at least 25 and preferably an acid value of at least 40 so that upon neutralization with a base, the air-drying polyurethane can be utilized as a water-reducible composition. Typically, useful acid values range from 25 to about 150 and most preferably range from 40 to about 100. The amount of neutralization required is only that amount necessary to provide the desired degree of water dispersibility. Useful bases include amines such as ammonia, diethanol amine, triethyl amine, etc. and hydroxides such as potassium hydroxide, sodium hydroxide, etc. Water and, if desired, suitable co-solvents such as esters, alcohols, etc. can be utilized as solvents for the neutralized polyurethane polymer.

This invention also relates to the use of clearcoat/basecoat compositions which utilize the air-drying polyurethane compositions as the clearcoat or basecoat composition.

It is therefore an object of this invention to provide improved air-drying polyurethane compositions. It is another object of this invention to provide water-reducible air-drying polyurethanes having improved hydrolytic stability.

A more limited object of this invention relates to substrates coated with a multi-layer decorative and/or protective coating which comprises:
(i) a basecoat comprising pigmented film-forming polymer; and
(ii) a transparent clearcoat comprising a film-forming polymer;
wherein the basecoat and/or the clearcoat comprises the water-reducible air-drying polyurethane of this invention. These and other objects of this invention will be apparent from the following description.

DETAILED DESCRIPTION OF THE INVENTION

The reaction of the 2-oxazoline containing fatty acid adduct, the diisocyanate and the acid-functional compound and any optional material to produce the water-reducible polymers of this invention can be conveniently accomplished by admixing, typically in the presence of an inert solvent such as esters, ethers or ketones, all of the reactants and maintaining the reaction conditions until the desired extent of reaction has been completed. Typically, the reaction is conducted at temperatures ranging from about 25° C. to about 120° C., and especially around 50° C. to 90° C., although somewhat higher or lower reaction temperatures can also be useful depending on the reactivity of the individual components. Temperatures of about 90° C. or less are preferred because there is essentially no reaction of the acid functionality of the preferred dihydroxy carboxylic acids with the isocyanate at those temperatures. It is preferred to conduct the reaction in the presence of a catalytic amount of a catalyst for the isocyanate reaction, such as tertiary amines or tin compounds such as dibutyl tin dilaurate. In one convenient method for preparing the polyurethanes of this invention, the 2-oxazoline fatty acid adduct, the acid-functional compound and any optional active hydrogen-containing materials are heated to the desired reaction temperature in the presence of an inert solvent and the isocyanate-containing reactant is gradually added to the heated mixture over a period of several hours. If desired, the reaction can be quenched by the addition of methanol or other material which will react with any remaining isocyanate groups.

As mentioned, if desired, the polyurethane polymers can be chain extended as is well known in the art by the addition of other diols or diamines along with the 2-oxazoline containing fatty acid adduct, the acid-functional compound and the diisocyanate. Typical chain extending diols include low molecular weight diols such as ethylene glycol, 1,4-cyclohexanedimethanol, 1,4-butane diol, 1,5-pentane diol, 1,6-hexane diol, 1,10-decane diol, polyether diols such as dipropylene glycol, tetrapropylene glycol, diethylene glycol and tetraethylene glycol, and the polycaprolactone diols. Higher molecular weight diols such as poly(tetramethylene ether)-glycol and homopolymers and copolymers of poly-(ethylene oxide) and poly(propylene oxide) are also useful. Typical chain extending diamines include ethylenediamine, 1,3-diaminopropane, 1,4-diaminobutane, 1,6 diaminohexane, para-phenylenediamine, isophorone diamine, 2-methylpentamethylenediamine, and 4,4′-methylene-bis(o-chloroaniline).

Optionally, very small amounts, e.g. less than about five percent by weight, preferably less than three percent by weight, of all the reactants, of polyfunctional materials having more than two active hydrogens or more than two isocyanate groups can also be included in the reaction mixture. Representative polyfunctional materials include polycaprolactone triols, trimethylol propane, triethanol amine, tetraethylenetriamine, diethylenetriamine or tri-functional isocyanates such as the tri-functional biuret of hexamethylene diisocyanate sold by Mobay Company as Desmodur N ® 100. If polyfunctional materials are utilized, care must be exercised to prevent gelation of the reaction mixture by techniques such as careful selection of the equivalent ratios, order of addition, and use of quenchants such as methanol.

The 2-oxazoline containing fatty acid adduct, the acid-functional compound and, optionally, the chain extending diol or diamine and/or the active hydrogen containing polyfunctional material can be utilized in any proportion relative to each other with the proviso that it is preferable to have the acid-functional compound present in an amount to provide an acid value of at least 25, and preferably at least 40, in the final polyurethane polymer to allow for water dispersibility upon neutralization. It is also preferred that the polyurethane be free of any unreacted isocyanate. Therefore, for each equivalent of isocyanate there should be 1.0 to about 1.4 total equivalents of active hydrogen available from the 2-oxazoline containing fatty acid adduct and the acid-functional compound and, if utilized, the polyfunctional compound and/or the chain extending diol or diamine. Typically, depending on the molecular weight of the raw materials and the performance characteristics desired, the acid-functional compound will comprise about 5 to 40 percent by weight of the reactants, the 2-oxazoline containing fatty acid adduct will comprise about 10 to about 50 percent by weight, and the diisocyanate will comprise about 30 percent to about 70 percent. The optional diol or diamine chain extenders can be present at from 0 to about 30 percent by weight. The optional polyfunctional compounds can be present in the reaction mixture from 0 to about 5 percent by weight.

The 2-oxazoline containing fatty acid adducts of unsaturated fatty acids utilized in the preparation of the polyurethanes of this invention are conveniently obtained by the reaction of tris(hydroxymethyl)aminomethane with fatty acids or fatty acid derivatives, such as the fatty acid esters or fatty acid chlorides. The term "fatty acid derivative" means those derivatives of a fatty acid where the —OH group of the carboxylic acid has been replaced by —Cl or —OR, where R is 1 to about 4 carbons, and where the fatty acid derivative is reactive with an amine to produce an amide. The fatty acids are obtained from drying and/or semidrying oils, such as linseed oil, soybean oil, tall oil, dehydrated castor oil, tung oil, and fish oil. Tris(hydroxymethyl)aminomethane is commercially available from a variety of suppliers including Sigma Chemical Company and Angus Chemical Company.

Although it is not our intent to be bound by theory, it appears that the reaction between the tris(hydroxymethyl)aminomethane and the fatty acid or fatty acid derivative to produce the 2-oxazoline involves the initial preparation of the amide followed by the subsequent loss of water and cyclization as follows:

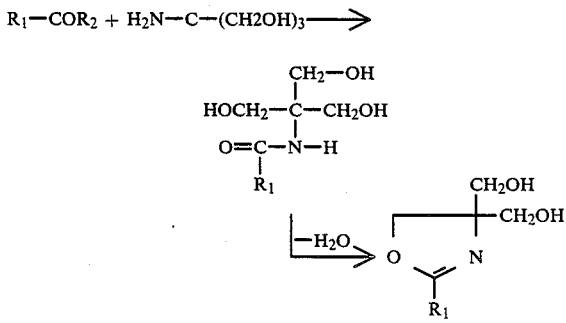

wherein $R_1$ is the aliphatic fatty acid residue and $R_2$ is —OH, —Cl, or $OR_3$ where $R_3$ is lower alkyl of 1 to about 4 carbons.

The reaction between the fatty acid or fatty acid derivative and the tris(hydroxymethyl)aminomethane to produce the amide may be conducted in the presence of an appropriate catalyst such as an alkali metal or alkali metal oxide. Typically, the fatty acids or fatty acid esters (usually the methyl ester or ethyl ester) are reacted with the amino group of the tris(hydroxymethyl)aminomethane in an inert solvent at temperatures ranging from about 80° C. to about 200° C. Useful fatty acid esters are conveniently prepared by reaction of the fatty acid or the triglyceride of the fatty acid with low molecular weight alcohols having one to about four carbon atoms.

Due to their reactivity, it is frequently preferred to utilize the fatty acid esters, and especially preferred to utilize the acid chlorides of the fatty acids for the reaction with the amino group of the tris(hydroxymethyl)aminomethane. The acid chlorides are conveniently prepared from the fatty acids by techniques well-known in the art, such as reaction with thionyl chloride, phosphorous trichloride, phosphorous pentachloride, oxalyl chloride, etc. The preparation of the acid chloride typically is obtained by reacting essentially chemically equivalent amounts of the fatty acid and the appropriate chloride in the presence of an inert solvent at reflux temperatures until the preparation of the acid chloride is complete. When the acid chloride is subsequently reacted with the tris(hydroxymethyl)aminomethane, a tertiary amine such as triethylamine will typically be added to scavenge the acid liberated by the reaction. The acid chloride and the tris(hydroxymethyl)aminomethane are typically reacted in the presence of an inert solvent at essentially a 1:1 equivalent ratio at temperatures ranging from about 5° C. to about 60° C. to produce the fatty acid amide. Alternatively, the reaction of the fatty acid chloride and the tris(hydroxymethyl)aminomethane can be performed in the presence of a base such as pyridine or sodium hydroxide (Schotten-Baumann reaction conditions).

Once the fatty acid amide has been prepared, the product can be cyclized to produce the 2-oxazoline containing fatty acid adduct by heating the amide to temperatures ranging from about 125° C. to about 275° C., and preferably about 180° C. to 220° C. to produce the 2-oxazoline fatty acid product. When the fatty acid amide is obtained by the reaction of a fatty acid or fatty acid ester it is convenient to merely maintain the reaction at temperatures above about 180° C. to simultaneously conduct the preparation of the amide and its cyclization into the 2-oxazoline. Since the cyclization involves the production of water as a by-product, the cyclization reaction can be conveniently monitored by following the rate of water production.

The diisocyanates which are suitable in the preparation of the polyurethanes of this invention are well known in the art. Representative diisocyanates include the aliphatic diisocyanates such as trimethylene, tetramethylene, pentamethylene, hexamethylene, trimethylhexamethylene, 1,2-propylene, 1,2-butylene, 2,3-butylene, 1,3-butylene, ethylidine and butylidene diisocyanates; the cycloalkylene diisoayantes such as 3-isocyanotomethyl-3,5,5-trimethylcyclohexylisocyanate, and the 1,3-cyclopentane, 1,4-cyclohexane, and 1,2-cyclohexane diisocyanates; the aromatic diisocyanates such as m-phenylene, p-phenylene, 4,4'-diphenyl, 1,5-naphthalene and 1,4-naphthalene diisocyanates; the aliphaticaromatic diisocyanates such as 4,4'-diphenylene methane, 2,4- or 2,6-toluene, or mixtures thereof, 4,4'-toluidine, and 1,4-xylylene diisocyanates; the nuclear substituted aromatic diisocyanates such as dianisidine diisocyanate, 4,4'-diphenylether diisocyanate and chloro-diphenylene diisocyanate. Prepolymers having two isocyanate groups per molecule, such as those obtained by the reaction of an excess of diisocyanate with active hydrogen-containing compounds such as diols, diamines, etc. are also convenient for the preparation of suitable diisocyanate reactants.

The acid-functional compounds useful in the practice of this invention have at least one acid group, such as a carboxylic acid or sulfonic acid group, and two active hydrogen groups, other than carboxylic acid groups, which are capable of reacting with the diisocyanate. Active hydrogen functionality means those reactive groups as determined by the Zerewitinoff Method as described by Kohler in J.Am.Chem.Soc. 49-3181 (1927). Representative reactive groups include —OH, —SH, —NH, etc. Especially preferred groups for reaction with the isocyanate groups are primary and secondary hydroxyl groups and primary and secondary amino groups. Since the diisocyanates react preferentially with the hydroxyl groups or amino groups, rather than reacting with the sulfonic or carboxylic acid groups, the acid-functional compound can be reacted with the diisocyanate and the acid functionality remains intact to provide the acid-functional polyurethane. Optionally, it is sometimes preferred to neutralize the sulfonic or carboxylic acid groups with a tertiary amine prior to reaction with the isocyanates in order to completely minimize any possible reaction of the acid group with the isocyanate groups.

Examples of acid-functional compounds having at least one carboxylic acid group and having two hydroxy groups include 1,2-dihydroxypropionic acid, 2,3-dihydroxypropionic acid, 2,5-dihydroxypentanoic acid, 2,3-dihydroxysuccinic acid and 8,9-dihydroxystearic acid.

Examples of acid-functional compounds having at least one acid group and two amino groups include α,β-diaminovaleric acid, lysine, α,β-diaminopropionic acid, 2,3-diamino-propane sulfonic acid, and the like.

Especially preferred in the practice of the invention are dihydroxy carboxylic acid compounds having the formula:

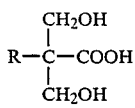

wherein R is hydrogen or alkyl of 1 to 20 carbons. Representative acids include 2,2-di(hydroxymethyl)acetic acid, 2,2-di(hydroxymethyl)propionic acid, 2,2-di(hydroxymethyl)pentanoic acid, 2,2-di(hydroxymethyl)valeric acid, etc. Especially preferred as the acid-functional compound is 2,2-di(hydroxymethyl)propionic acid.

Acid-functional compounds having at least one sulfonic acid group and two hydroxyl groups include 1,2-dihydroxy-propane-3-sulfonic acid, 2,3-dihydroxy-propane-sulfonic acid, 1,4-dihydroxybutane-2-sulfonic acid, etc.

The coatings of this invention can be utilized as clearcoatings or optionally may contain extender and/or opacifying pigments as is well known in the art. Representative extender pigments include calcium carbonate, clays (aluminum silicates), talc, magnesium silicate, silicas, calcium silicate, micas (potassium aluminum silicate), barytes, gypsum (calcium sulfate), diatomaceous earth, etc. Representative opacifying pigments include titanium dioxide, zinc oxide, antimony oxide, organic or inorganic chromatic pigments, such as iron oxide, carbon black, zinc chromate, phthalocyanine blue, etc., as well as metallic pigments such as aluminum, etc.

The coatings may also contain other additives such as flow agents, catalysts or metallic driers such as cobalt, manganese, lead, zinc, rare earth metals, etc., diluents, which may be reactive, ultraviolet light absorbers, etc. Optionally, the coatings could also include crosslinkers such as polyepoxides, which are reactive with the acid groups of the polyurethane, or, if the polyurethane is formulated with excess hydroxyl groups remaining, the crosslinkers could include melamine, urea or isocyanate types of crosslinkers. The coatings may typically be applied to any substrate, such as metal, plastic, wood, glass, synthetic fibers, etc. by brushing, dipping, roll coating, flow coating, spraying, electrodeposition, or other method conveniently employed in the coating industry. Normally, the coatings of this invention are cured at room temperature, but bake temperatures up to about 250° C. can be utilized to force dry or crosslink the coatings.

One preferred use of the air-drying polyurethanes of this invention relates to their use as clearcoats and/or basecoats in clearcoat/basecoat formulations.

Clearcoat/basecoat systems are well known, especially in the automobile industry where it is especially useful to apply a pigmented basecoat, which may contain metallic pigments, to a substrate and allow it to form a polymer film followed by the application of a clearcoat which will not mix with or have any appreciable solvent attack upon the previously applied basecoat. The basecoat composition may be any of the polymers known to be useful in coating compositions including the air-drying polyurethane compositions of this invention. The water-reducible polyurethane of this invention can be utilized in combination with either solvent based or water-missible basecoats and clearcoats.

One useful polymer basecoat includes the acrylic addition polymers, particularly polymers or copolymers of one or more alkyl esters of acrylic acid or methacrylic acid, optionally together with one or more other ethylenically unsaturated monomers. These polymers may be of either the thermoplastic type or the thermosetting, crosslinking type which contain hydroxyl or amine or other reactive functionality which can be crosslinked. Suitable acrylic monomers for either type of polymer include methyl methacrylate, ethyl methacrylate, propyl methacrylate, butyl methacrylate, ethyl acrylate, butyl acrylate, acrylonitrile, acrylamide, etc. Other ethylenically unsaturated monomers which can be copolymerized with the acrylic monomers include styrene, vinyl acetate and vinyl chloride. Where the polymers are required to be of the crosslinking type, suitable functional monomers which can be used in addition to those already mentioned include acrylic or methacrylic acid, hydroxy ethyl acrylate, 2-hydroxy propyl methacrylate, glycidyl acrylate, tertiary-butyl amino ethyl methacrylate, etc. The basecoat composition may, in such a case, also contain a crosslinking agent such as a polyisocyanate a polyepoxide, or a nitrogen resin such as a condensate of an aldehyde such as formaldehyde with a nitrogenous compound such as urea, melamine or benzoguanamine or a lower alkyl ether of such a condensate.

Other polymers useful in the basecoat composition include vinyl copolymers such as copolymers of vinyl esters of inorganic or organic acids, such as vinyl chloride, vinyl acetate, vinyl propionate, etc., which copolymers may optionally be partially hydrolyzed so as to introduce vinyl alcohol units.

Other polymers useful in the manufacture of the basecoat include alkyd resins or polyesters which can be prepared in a known manner by the condensation of polyhydric alcohols and poly carboxylic acids, with or without the inclusion of natural drying oil fatty acids.

The polyesters or alkyds may contain a proportion of free hydroxyl and/or carboxyl groups which are available for reaction, if desired with suitable crosslinking agents as discussed above.

If desired, the basecoat composition may also contain minor amounts of a cellulose ester, to alter the drying or viscosity characteristics of the basecoat.

Typically, the basecoat will include pigments conventionally used for coating compositions and after being applied to a substrate, which may or may not previously have been primed, the basecoat will be allowed sufficient time to form a polymer film which will not be lifted during the application of the clearcoat. The clearcoat is then applied to the surface of the basecoat, and the system can be allowed to dry or, if desired, can be force dried by baking the coated substrate at temperatures typically ranging up to about 250° F.

Typically, the clearcoat may contain ultraviolet light absorbers such as hindered phenols or hindered amines at a level ranging up to about 6% by weight of the vehicle solids as is well known in the art. The clearcoat composition may comprise any of the polymers known to be useful in coating compositions including the air-drying polyurethanes of this invention. The clearcoat can be applied by any application method known in the art, but preferably will be spray applied. If desired, multiple layers of basecoat and/or clearcoat can be applied. Typically, both the basecoat and the clearcoat will each be applied to give a dry film thickness of about 0.01 to about 6.0, and especially about 0.5 to about 3.0 mils.

The following examples are intended to illustrate the invention but are not presented as limitations upon the scope of the claims.

EXAMPLE I

Preparation of Fatty Acid Substituted 2-Oxazoline Adduct

A reaction vessel equipped with a stirrer, nitrogen inlet, Dean-Stark trap, and reflux condenser was charged with 280 grams linseed fatty acid, 121 grams tris(hydroxymethyl)aminomethane and 20 milliliters of xylene. The mixture was heated to 200° C. with stirring under an atmosphere of nitrogen. The water collected in the Dean-Stark trap was removed periodically. Heating was continued until no additional water was collected in the trap. A light brown colored solid (376 grams) was obtained on cooling. The product had an acid value of 7.4 mg KOH/g and an infrared spectrum which gave peaks at 1660 and 1745 cm$^{-1}$. The ratio of the intensity of the peak at 1660 (due to 2-oxazoline group) to that of the 1745 peak (ester) was 3.2:1 indicating the predominance of the 2-oxazoline formation.

EXAMPLE II

Preparation of Polyurethanes

Examples III, IV, V and VI show the preparation of water-reducible polyurethane products incorporating the fatty acid substituted 2-oxazoline materials prepared as shown in Example I. The polyurethanes were prepared at 60% by weight of reactants in mixtures of methyl ethyl ketone (MEK) and N-methyl-2-pyrrolidinone (NMP). The polymers were prepared in a reaction vessel as described in Example I according to the following general procedure.

The fatty acid substituted 2-oxazoline adduct of Example I and 2,2-di(hydroxymethyl)propionic acid (DMPA) were added to the reaction vessel and heated to obtain a homogeneous mixture. NMP, MEK (a part of the total amount) and catalyst (dibutyl tin dilaurate, T-12, M&T Chemicals) were added at this time and the mixture heated to 75° C. to 80° C. The amount of catalyst used was 0.02% based on monomer weight. The solution of diisocyanate (Desmodur ® W (trademark of the Mobay Company for 4,4'-methylene-bis(cyclohexylisocyanate))) in MEK (remaining amount) was then added over 2 to 3 hours with stirring. After the completion of the isocyanate addition, the reaction mixture was held at 75° C. to 80° C. until the desired extent of reaction was attained. The progress of the reaction was followed by infrared spectroscopy (the decrease in isocyanate peak intensity). The reaction was quenched by the addition of excess methanol and a sample saved for determination of the characteristics of the polyurethane. To obtain an aqueous dispersion of the polyurethane, the required amount of ammonia or triethylamine (TEA) was added to the solution of polyurethane. Deionized water and, if desired, more co-solvent (NMP or ethylene glycol monobutyl ether) was then added and a part of the volatiles were removed under reduced pressure to obtain the aqueous dispersion of polyurethane at the required weight solids.

EXAMPLE III

This polyurethane was prepared according to the general procedure outlined above. After the addition of Desmodur ® W, the reaction mixture was held at 75° C. to 80° C. for 2.5 hours. To 767 grams of 63% solution of polyurethane, 64 grams of 28% aqueous ammonia and 170 grams of deionized water were added. A part of the volatiles were removed under reduced pressure to obtain an aqueous dispersion of 50% NVM.

EXAMPLE IV

The general procedure was followed and the reaction mixture was held at 75° C. to 80° C. for one hour after the addition of Desmodur ® W and then trimethylolpropane (TMP) was added and the reaction mixture held for an additional three hours at 75° C. to 80° C. To 572 grams (58% NVM) of polyurethane solution, 19.7 grams of 28% aqueous ammonia and 232 grams deionized water were added. A part of the volatiles were removed under reduced pressure to obtain an aqueous dispersion of 49% NVM.

EXAMPLE V

The general procedure was followed and the reaction mixture was held at 75° C. to 80° C. for three hours after the completion of addition of Desmodur ® W. To 3,258 grams (61% NVM) of polyurethane solution, 86.5 grams of 28% aqueous ammonia and 1,000 grams of water were added. A part of the volatiles were removed under reduced pressure and more water was added to obtain an aqueous dispersion of 42% NVM.

EXAMPLE VI

The procedure used for Example IV was followed. The reaction was held for 3.5 hours after the addition of TMP. A part of this material was neutralized with triethylamine and part with ammonia. To 223 grams (59% NVM) of the polyurethane solution, 6.42 grams of 28% aqueous ammonia and 181 grams of deionized water were added. A part of the volatiles were removed under reduced pressure to obtain a polyurethane dispersion of 50% NVM which was further reduced with water to obtain an aqueous polyurethane dispersion of 31% NVM. To another 223 grams (59% NVM) of the polyurethane solution, 10.7 grams of triethylamine and 110 grams of deionized water were added. After removal of volatiles to 39% NVM, more water was added to obtain an aqueous dispersion of 29% NVM. Both samples of aqueous dispersions of polyurethanes were stored at 120° F. for four weeks. The initial acid values of the polyurethanes were 54 and 49, respectively, and after four weeks of storage at 120° F. were 43 and 48, respectively, showing the excellent storage stability of these materials.

The composition of the polyurethanes and their characteristics are provided in Tables 1 and 2, respectively.

(i) a 2-oxazoline containing adduct having the structure:

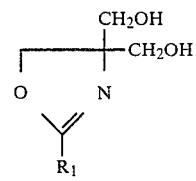

wherein $R_1$ is the aliphatic fatty acid residue from a fatty acid $R_1COOH$; and
(ii) a diisocyanate; and
(iii) an acid-functional compound which also has two

TABLE 1
COMPOSITION OF FATTY ACID SUBSTITUTED POLYURETHANES

| | Reactants in Parts by Weight | | | | | | |
|---|---|---|---|---|---|---|---|
| Example No. | Adduct of Example I | DMPA[1] | Desmodur W[2] | | Modifier Alcohol | | Solvent Ratio (NMP:MEK) |
| III | 36 (1 mol) | 13 (1 mol) | 51 | (2 mol) | — | | 3:5 |
| IV | 36 (1 mol) | 13 (1 mol) | 50 | (2 mol) | TMP[3] | (0.05 mol) | 3:5 |
| V | 36 (1 mol) | 13 (1 mol) | 51 | (2 mol) | — | | 3:5 |
| VI | 36 (1 mol) | 13 (1 mol) | 50 | (2 mol) | TMP[3] | (0.05 mol) | 1:7 |

[1]DMPA = 2,2-di(hydroxymethyl)propionic acid
[2]Desmodur W (Mobay) = bis(4-isocyanatocyclohexyl)methane
[3]TMP = trimethylolpropane

TABLE 2
CHARACTERISTICS OF FATTY ACID SUBSTITUTED POLYURETHANES

| Example No. | Mol. Wt. Mn | (GPC)[1] Pd | Acid Value[2] (On Solids) | NCO Value (%)[3] | Brookfield Viscosity (poise) | Color[4] | NVM (%) |
|---|---|---|---|---|---|---|---|
| III | 3,900 | 3.8 | 55 | — | 430 | 8 | 63 |
| IV | 3,200 | 2.8 | 55 | 1.57 | 108 | 7 | 58 |
| V | 2,700 | 2.5 | 57 | 2.61 | 110 | 4–5 | 61 |
| VI | 3,700 | 3.3 | 54 | — | 130 | 4–5 | 59 |

[1]With respect to polystyrene standards.
[2]mg of kOH/g
[3]Weight percent on solids.
[4]Gardner scale.

The polyurethane coatings prepared in Examples III and IV were mixed with cobalt drier (0.01 weight percent based on solids) and were drawn down over iron phosphate treated steel panels to provide dry film thicknesses of 1–1.5 mils. The coating properties were determined after one day and after one week of air dry at room temperature. The results of the coating evaluations are given in Table 3.

active hydrogen groups, other than acid groups, which are reactive with the diisocyanate.

2. The polyurethane of claim 1 wherein the 2-oxazoline containing adduct is obtained by the reaction of a fatty acid or fatty acid derivative and tris(hydroxymethyl)aminomethane to produce an amide followed by cyclization of the amide to produce the 2-oxazolidine containing adduct.

TABLE 3
PROPERTIES OF COATINGS BASED ON
W/R LINSEED FATTY ACID SUBSTITUTED POLYURETHANES

| | Dry Time[1] | | KPH[4] | | Pencil Hardness | | Isopropanol Rubs[2] | | Water Soak Test[3] | |
|---|---|---|---|---|---|---|---|---|---|---|
| Example No. | DTT | min TF | 1 Day | 7 Day | 1 Day | 7 Day | 1 Day | 7 Day | 1 Day | 7 Day |
| III | 16 | 25 | 122 | 134 | HB | HB | 6–7 | 7 | Sl. discol. | No effect |
| IV | 18 | 76 | 103 | 124 | HB | HB | 6–7 | 7 | Sl. discol. | No effect |

[1]DTT - Dry-to-touch; TF = Tack-free, 50 g Zapon
[2]10 - Best; 1 - Poor (100 double rubs)
[3]After 4 hr. soak in water
[4]Konig Pendulum Hardness

The invention claimed is:
1. An air-drying, water-reducible, acid-functional polyurethane which comprises the reaction product obtained by reacting:

3. The polyurethane of claim 2 wherein the fatty acid derivative is a fatty acid chloride.

4. The polyurethane of claim wherein the active hydrogen groups on the acid-functional compound are hydroxyl groups.

5. The polyurethane of claim 4 wherein the acid-functional compound has the formula:

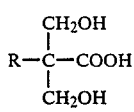

wherein R is hydrogen or alkyl of 1 to 20 carbons.

6. The polyurethane of claim 5 wherein R is alkyl of 1 to 8 carbons.

7. The polyurethane of claim 5 wherein the acid-functional compound is selected from the group consisting of 2,2-di(hydroxymethyl)acetic acid, 2,2-di(hydroxymethyl)propionic acid, 2,2-di(hydroxymethyl)pentanoic acid and 2,2-di(hydroxymethyl)valeric acid.

8. The polyurethane of claim 1 wherein the active hydrogen groups on the acid-functional compound are amine groups.

9. The polyurethane of claim 1 further characterized in that it has an acid value of at least 25.

10. The polyurethane of claim 1 further characterized in that it has an acid value of at least 40.

11. The polyurethane of claim 1 further characterized in that it has an acid value ranging from about 25 to about 150.

12. The polyurethane of claim 1 further characterized in that it has an acid value of 40 to about 100.

13. The polyurethane of claim 1 further characterized in that it also incorporates a metallic drier.

14. The polyurethane of claim 1 further characterized in that the acid-functional compound is 2,2-di(hydroxymethyl)propionic acid.

15. The polyurethane of claim 1 further characterized in that the polyurethane is chain extended by the addition of a diol or a diamine.

16. The polyurethane of claim 1 wherein the ratio of equivalents of isocyanate to the total equivalents of active hydrogen available from the hydroxyl groups of the 2-oxazoline fatty acid adduct and the active hydrogen groups of the acid-functional compound is from 1/1 to about 1/1.4.

17. The polyurethane of claim 1 wherein the polyurethane also incorporates a polyfunctional compound.

18. An air-drying, water-reducible, acid-functional polyurethane which comprises the reaction product obtained by reacting a mixture of reactants which comprises in percent by weight:
(i) 10 to 50% of a 2-oxazoline containing adduct having the structure:

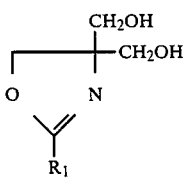

wherein $R_1$ is the aliphatic fatty acid residue from a fatty acid $R_1COOH$; and
(ii) 30-70% of a diisocyanate; and
(iii) 5-40% of an acid-functional compound which also has two active hydrogen groups, other than acid groups, which are reactive with the diisocyanate; and
(iv) 0-30% of a diol or diamine chain extender; and
(v) 0-5% of a polyfunctional material having more than two active hydrogens or more than two isocyanate groups per molecule.

19. An aqueous coating composition which comprises an aqueous dispersion of a base-neutralized acid-functional air-drying polyurethane wherein the acid-functional air-drying polyurethane comprises the reaction product obtained by reacting:
(i) a 2-oxazoline containing adduct having the structure:

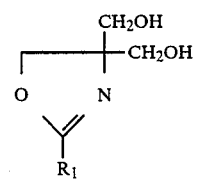

wherein $R_1$ is the aliphatic fatty acid residue from a fatty acid $R_1COOH$; and
(ii) a diisocyanate; and
(iii) an acid-functional compound which also has two active hydrogen groups, other than acid groups, which are reactive with the diisocyanate.

20. The aqueous coating composition of claim 19 wherein the coating composition also incorporates a crosslinker for the acid-functional polyurethane.

21. In a substrate coated with a multi-layer decorative and/or protective coating which comprises:
(a) a basecoat comprising a pigmented film-forming polymer; and
(b) a transparent clearcoat comprising a film-forming polymer applied to the surface of the basecoat composition;
the improvement which comprises utilizing as the clearcoat and/or the basecoat an aqueous coating which comprises an aqueous dispersion of a base-neutralized acid-functional air-drying polyurethane wherein the acid-functional air-drying polyurethane comprises the reaction product obtained by reacting:
(i) a 2-oxazoline containing adduct having the structure:

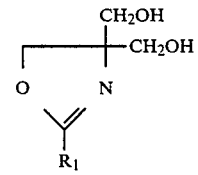

wherein $R_1$ is the aliphatic fatty acid residue from a fatty acid $R_1COOH$; and
(ii) a diisocyanate; and
(iii) an acid-functional compound which also has two active hydrogen groups, other than acid groups, which are reactive with the diisocyanate.

22. The coated substrate of claim 21 wherein the polyurethane is further characterized in that the 2-oxazoline containing adduct is obtained by the reaction of a fatty acid or fatty acid derivative and tris(hydroxymethyl)aminomethane to produce an amide followed by cyclization of the amide to produce the 2-oxazoline containing adduct.

23. The coated substrate of claim 21 wherein the polyurethane is further characterized in that the active hydrogen groups on the acid-functional compound are hydroxyl groups.

24. The coated substrate of claim 23 wherein the polyurethane is further characterized in that the acid-functional compound has the formula:

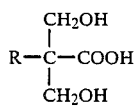

wherein R is hydrogen or alkyl of 1 to 20 carbons.

25. The coated substrate of claim 24 wherein the polyurethane is further characterized in that R is alkyl of 1 to 8 carbons.

26. The coated substrate of claim 24 wherein the polyurethane is further characterized in that the acid-functional compound is selected from the group consisting of 2,2-di(hydroxymethyl)acetic acid, 2,2-di(hydroxymethyl)propionic acid, 2,2-di(hydroxymethyl)pentanoic acid and 2,2-di(hydroxymethyl)valeric acid.

27. The coated substrate of claim 21 wherein the polyurethane is further characterized in that the active hydrogen groups on the acid-functional compound are amine groups.

28. The coated substrate of claim 21 wherein the polyurethane is further characterized in that the polyurethane has an acid value of at least 25.

29. The coated substrate of claim 21 wherein the polyurethane is further characterized in that the polyurethane has an acid value of at least 40.

30. The coated substrate of claim 21 wherein the polyurethane is further characterized in that the polyurethane has an acid value ranging from about 25 to about 150.

31. The coated substrate of claim 21 wherein the polyurethane is further characterized in that the polyurethane has an acid value ranging from about 40 to about 100.

32. The coated substrate of claim 21 wherein the polyurethane is further characterized in that the polyurethane also incorporates a metallic drier.

33. The coated substrate of claim 21 wherein the polyurethane is further characterized in that the acid-functional compound is 2,2-di(hydroxymethyl)propionic acid.

34. The coated substrate of claim 21 wherein the polyurethane is further characterized in that the polyurethane is chain extended by the addition of a diol or a diamine.

35. The coated substrate of claim 21 wherein the polyurethane is further characterized in that the ratio of equivalents of isocyanate to the total equivalents of active hydrogen is from 1/1 to about 1/1.4.

36. The coated substrate of claim 21 wherein the polyurethane is further characterized in that the polyurethane also incorporates a polyfunctional compound.

37. The coated substrate of claim 21 wherein the polyurethane is further characterized in that the polyurethane comprises in percent by weight:

(i) 10 to 50% of a 2-oxazoline containing adduct having the structure:

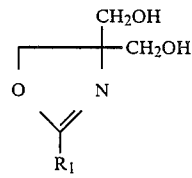

wherein $R_1$ is the aliphatic fatty acid residue from a fatty acid $R_1COOH$; and (ii) 30–70% of a diisocyanate; and (iii) 5–40% of an acid-functional compound which also has two active hydrogen groups, other than acid groups, which are reactive with the diisocyanate; and (iv) 0–30% of a diol or diamine chain extender; and (v) 0–5% of a polyfunctional material having more than two active hydrogens or more than two isocyanate groups per molecule.

* * * * *